United States Patent Office 3,195,837
Patented July 20, 1965

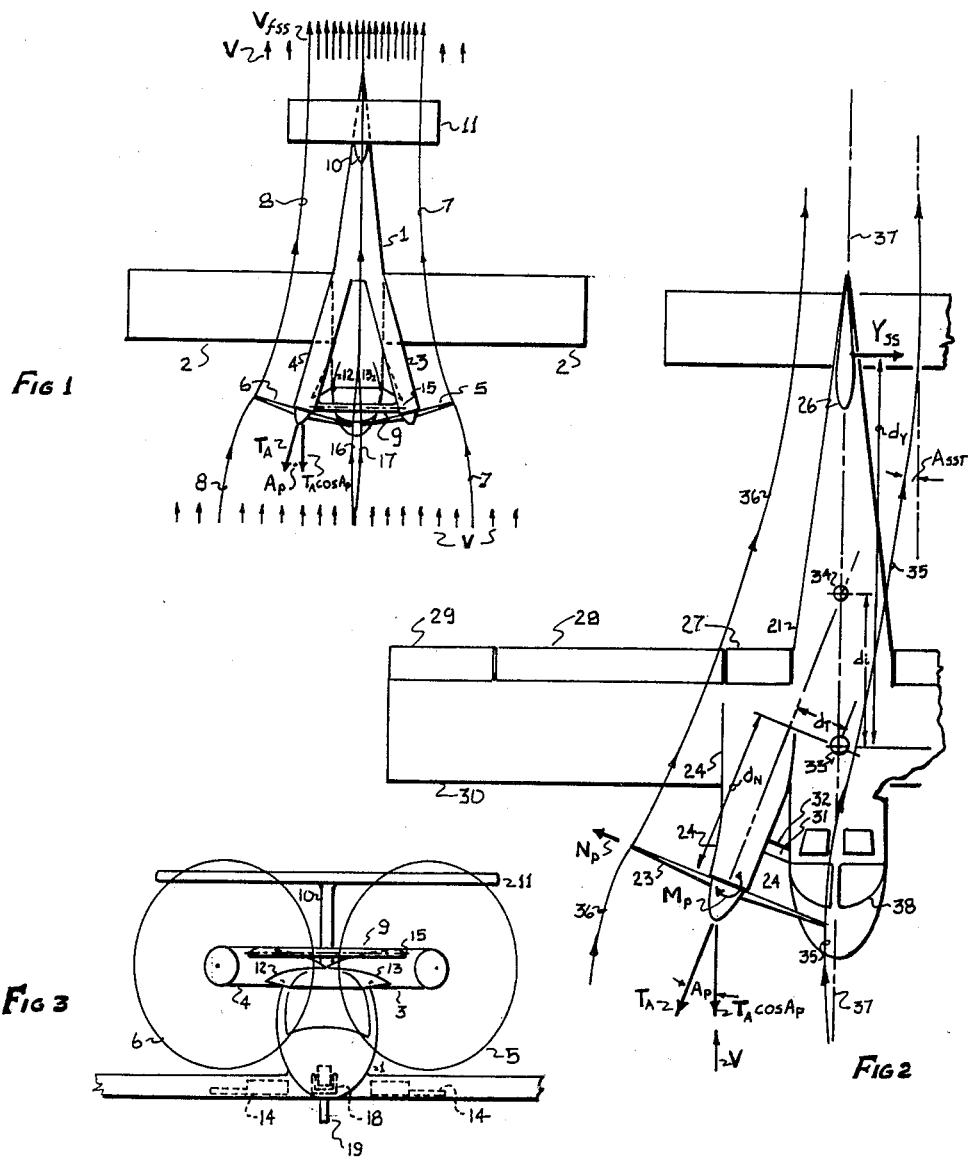

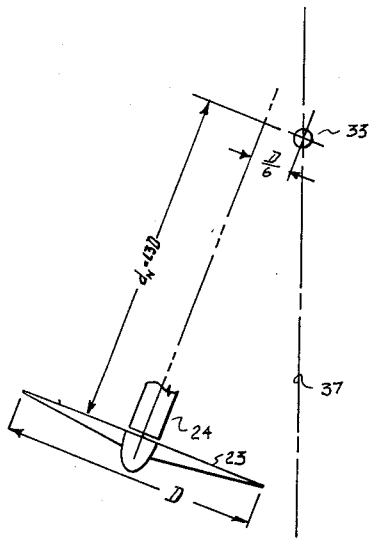
Fig 2A
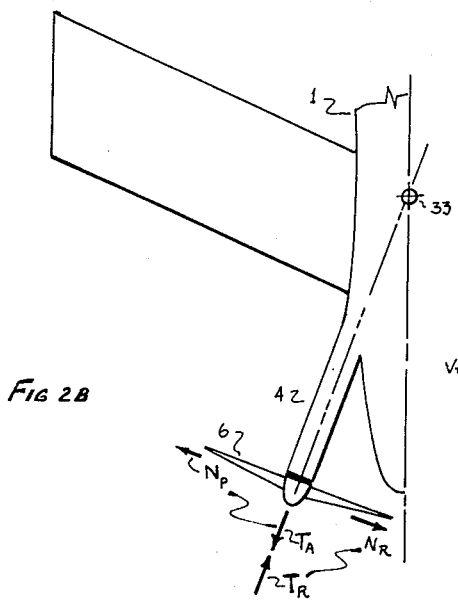
Fig 2B
Fig 2C

3,195,837
HEAVIER THAN AIR FLYING APPARATUS WITH A PLURALITY OF AIRSCREWS
Alberto Alvarez-Calderón, 1560 Castilleja St., Palo Alto, Calif.
Filed Feb. 25, 1963, Ser. No. 260,428
18 Claims. (Cl. 244—55)

The present invention is related to a multi-engine aircraft. More specifically, my invention concerns new aircraft configurations designed for multi-propeller, short takeoff and landing aircraft.

The use of multi-engine aircraft is desirable to permit continuous flight even in the event of a failure of one engine. However, for aircraft that fly at reduced speeds or with very large thrusts, the failure of one engine can result in uncontrollable motions because of slow speeds the effectiveness of control surfaces such as rudder and ailerons is much decreased, as is well known.

The well known serious problems of engine failure at slow speeds in a multi-engine aircraft are yaw due to unsymmetric thrust, roll due to yaw produced by unsymmetric thrust, roll due to differences of slipstream effects on a wing, and deterioration of controllability and increase of drag due to deflections of control surfaces to trim the unsymmetric force conditions existing with engine failure.

These problems are extremely serious for STOL aircraft which derive a large proportion of their STOL performance from propeller slipstream.

As a preamble to my specification, I will discuss further these problems in two typical airplane configurations.

First, we consider a twin engine STOL aircraft having engines mounted on the wing with the propellers on the sides of the fuselage in a conventional fashion. One example would be the Grumman Mohawk type of configuration. If one engine fails, say the right engine, the aircraft yaws to the right, rolls to the right due to loss of slipstream in the right wing, and rolls to right due to yaw and dihedral effect. Consequently, at sufficiently slow speeds below minimum control speed, aircraft will spiral downward to the right and crash. To prevent this occurrence in STOL the minimum control speed has to be brought down by means of large vertical tail surfaces required for yaw control of unsymmetric thrust, which large tail increases airplane skin and interference drag and weight. In an effort to decrease the overall drag, the wing is kept to a minimum area which is adverse for lift: additionally, large ailerons are needed for roll control in unsymmetric flight which decreases the span of the flap and wing lift. Furthermore, with the engines on the wing, and a wing-mounted landing gear, either the engines are mounted above the wing, which is unfavorable for lift but allows propeller clearance with a mid wing arrangement and a short gear, or else the wing is placed as a high wing installation with the resulting good wing-engine aerodynamics but long and heavy landing gear. The resulting aircraft usually has excessive wing loadings for efficient single engine climb, particularly because for single engine flight there is a large drag produced from the deflected surfaces for trim and poor engine wing junction of the inoperative engine. It is often the case that the minimum flying speed of the multi-propeller driven STOL aircraft of conventional design is not dictated by the high lift configuration of the wing as should be the case, but by the inability to control the aircraft in single engine flight, or to climb with one engine. The efforts to lower the minimum control speed have resulted in aircraft configurations with a typically poor STOL performance and low top speed capability which are well known.

As an improvement to the above problems of multi-engine STOL aircraft, a second method has been proposed in which there is interconnection of the propellers with a spanwise shaft to preclude unsymmetric thrust conditions with unsymmetric engine failure. While these measures are in the right direction, there still remains the possibility of propeller failure or propeller damage in combat in which case even a cross shafted system would produce unsymmetric thrusts with their consequent control problems at slow speed. In addition, the cross shafting system adds weight and cost to the aircraft.

It is evident by the reasoning presented above and by inspection of performance of STOL aircraft existing today and the solutions proposed by the state of the art for single engine flight that there exists a very serious need to obtain a fail-safe system or configuration for STOL aircraft which would be fail-safe even in the event of propeller failure, and which additionally should be simple and not introduce large trimmed drags for single engine climb. I have invented such a system.

My invention pertains to multi-engine aircraft and prescribes the required location and orientation of the propulsive system on an aircraft with respect to the fuselage, tail surfaces and center of gravity. In a discovery of my invention, I make a particular use of propeller forces and couples in the propeller to aid in trimming out the unsymmetric forces developed in single engine flight, and I present new auxiliary surfaces mounted in combination with my propulsive system to provide improved airflows and pitch control characteristic in slow speed flight.

It is one purpose of my invention to provide structure for multi-engine aircraft in which the failure of one engine has greatly reduced or negligible effect in the usually adverse trim air controllability characteristics of the aircraft.

Yet another purpose of my invention is to utilize the forces that are developed by the propeller in the direction of the propeller disc and the couples that are developed in a horizontal plane, as loads which serve to trim and control the unsymmetric yaw and adverse roll produced by single engine flight or by engine failure.

One more object of my invention is to prescribe a configuration of the class described with excellent propulsive efficiency.

Yet another object of my invention is to utilize a configuration of the type described above in which the dimensions relative location and proportions of the propellers, nacelles, wings, fuselage, and tail surfaces are prescribed to produce greatly decreased or negligible unsymmetric loads in the case of engine failure.

Yet one more object of the invention is to provide a low drag aerodynamic combination of bodies and surfaces for the structure described in the previous paragraph.

Another objective of my invention is the utilization of my propeller nacelles as supports for auxiliary pitch control surfaces which supports and control surface act in unique structural and aerodynamic cooperation for the aircraft.

Yet another objective of the invention is to prescribe an appropriate method of rotation of the propellers for my configuration in various flight conditions.

These and other objectives and features of the invention will be more readily apparent from a perusal of the description of the embodiments of the structure illustrated in the accompanying drawing in which:

FIGURE 1 shows a top view of my STOL aircraft incorporating "toed out" engines properly located on the aircraft and inclined at the pertinent directions with propellers, operating simultaneously.

FIGURE 2 shows in plane view a different embodiment of my aircraft showing only one engine and indicating the flow conditions for single engine flight and peculiar use of propeller loads for trim.

FIGURE 2A is an auxiliary figure to FIG. 2, showing certain specified proportions and dimensions.

FIGURE 2B is a partial top view of another embodiment of my invention using swept back wings.

FIGURE 3 shows the aircraft of FIG. 1 in front elevation showing the nacelle arrangement and cabin arrangement, indicating the various features which are used to provide high lift and low drag in the center section flow, and a practical landing gear and propeller clearance.

With initial reference to FIGURE 1, I show therein a top view of propeller-driven embodiment of my invention operating with both propellers operative.

Before discussing further this figure, I would like to discuss the usual methods of producing yawing couples to correct the unsymmetric loads in single engine operation: the classic approach is to place the propeller thrust line as close as possible to the center plane of the aircraft as shown (for different purposes), for example, in U.S. Patent 2,950,878 of Fowler. Observe, however, that this type solution, while it would reduce yawing couples due to unsymmetric thrust, it would not introduce by itself any corrective couples to cancel out the decreased but yet large remaining unsymmetric couples in single engine operation. It is evident that without propeller overlap, there will always be an adverse yawing couple equal to at least the product of thrust times propeller radius.

A second solution is the introduction of a "toe out" or outboard angular inclination in an horizontal plane on the fin or the propeller thrust lines in multi-engine configurations in an effort to direct the propeller slipstream to the tail surface at an angle such that for a single engine operation the existing slipstream arrives at the tail at a small angle to it, and the tail by deflecting the slipstream produces a side force in the tail tending to correct the yawing couples produced by the propellers' thrusts. This is shown, for instance, in U.S. Patent 2,402,311. This type of correction is extremely small, as can be calculated for "toe out" angle of installation of engines in actual wings such as, for instance, the Mohawk aircraft or the pre-World War II Junkers tri-motor, which have the usual configurations and a "toe out" restrained to small angles at most of the order of 5°. It is the usual understanding for toed-out engines with propellers that the effective propulsive thrust $T_E$ in a forward direction which is provided by a "toed out" propeller is equal to the propeller axial force $T_A$ times the cosine of the "toe out" angle $A_{TO}$. In other words, from elementary considerations of statics applied to the actual force felt by the propeller on a standard airflow, it has been assumed that generally $$T_E = T_A \cos A_{TO}$$

(See FIG. 1) (I)

This relation would indicate that for "toe out" angles of the order of say 5° the loss of effective thrust would be very small and less than 1% of the axial force $T_A$ since the cosine of $A_{TO}$ would be very close to 1 whereas say at a toe out angle of 20° the loss of effective thrust would be about 6% of the axial thrust and therefore unadmissible. It can be seen then one reason why the "toe out" angles have been kept small. Relation I, however, is true enough for a propeller operating by itself or by propellers located in conventional fashion in the wings of aircraft as has been done in the past. However, I have discovered it is possible to install propellers with large "toe out" angles by means of new ingenious arrangements which follow an approach to the explanation of propulsive forces depending on Newton's second law rather than on arbitrary trigonometric application of static equilibrium on the axial forces of a "toe out" propeller arrangement.

Consider that Newton's second law would predicate a propulsive thrust depending only on the change of momentum vector; that is, depending on the mass flow rate of air across the disc times the change of velocity vector of the flow through the disc. Now, the change of velocity has a magnitude and direction. The direction term is related to the cosine factor stated in Equation I above.

However, in my peculiar and superior arrangements as shown, for instance, in FIGURE 1, I utilize peculiar co-operation of the directions of the slipstream and aircraft in order to redirect the slipstream leaving the propeller before the additional slipstream energy is dissipated to the surrounding air, such that the final slipstream velocity VFSS leaving the aircraft is parallel to the remote airflow velocity V arriving to the aircraft as shown specifically on FIGURE 1. In my arrangement then the net change of velocity vector direction is zero regardless of the "to out" inclination of my propellers, and the cosine factor becomes 1. In other words, Formula I which has been applied as a standard method to predict the propulsive thrust loss is no longer valid for my configuration as a cosine factor no longer applies. For my configuration, the correct statement is then $T_E = T_A$.

The lack of change of direction of my slipstream flows with symmetric flight condition is illustrated in FIGURE 1 showing specifically a fuselage 1 having a low wing 2 and mounting "toed out" engine nacelles 3 and 4 on the left and right hand sides of the fuselage adjacent to the fuselage top in streamlined "horned" disposition. The nacelles mount propellers 5 and 6 which are shown having an axis of rotation with a "toe out" angle $A_P$ of 15°. It is seen that the wind arrives to the aircraft parallel to the aircraft's direction of motion and indicated as V, and the separate volumes of air delineated by streamlines 8–16 and 7–17 which eventually arrive to the separate propeller discs turn and contract into the low pressure area ahead of the toed-out propeller disc symmetrically about a central longitudinal axis on the fuselage; this two volumes of air becomes a single mixed slipstream shortly upon leaving the propeller discs at a rearward location approximately one propeller diameter to the rear of the discs; the slipstream is rearwardly directed at an increasing speed to a final velocity VFSS which is seen to be parallel to the approaching wind velocity. In the figure, the limiting streamlines of the combined slipstreams appear as 7 and 8. The remaining details of the figure will be discussed in front elevation of FIG. 3.

According to my configuration and explanation above, it now becomes possible for an airplane designer to determine his "toe out" angle with substantially no loss of propulsive thrust for high speed flight, and this enables great improvements in the reduction of the unsymmetric yaw and roll couples due to single-engine thrust, as well as the incorporation of an effective automatic yaw feed back correction for single engine operation to greatly diminished, or eliminate completely, the unsymmetric yawing couples completely, and even to reverse the sense of yaw with single engine operation. By the last statement, it is meant that it now becomes possible, if desired, to design a twin engine aircraft which, having a single engine failure, will turn by itself toward the side on which the remaining operative engine is located.

The above remarks concerning single engine operation are better explained with the aid of my FIGURE 2 illustrating a different embodiment of the invention in which I will show also additional details of the equilibrium and aerodynamics of my system during single engine flight.

Specifically, FIGURE 2 shows a fuselage 21 having a central longitudinal axis 37, a wing 30 and a cockpit enclosure 38 on the fuselage 21. On the left of the drawing there is shown a right propeller nacelle 24 supporting a propeller 23 which is capable of developing a propeller axial force $T_A$, a propeller normal force in the plane of the disc and in an outboard horizontal direction $N_P$ and a propeller couple in a horizontal plane $M_P$ in a direction tending to increase the angle of attack of the propeller thrust with respect to flight direction V. The angle between flight direction V and propeller thrust axis is $A_P$.

We now consider in detail the characteristics of my configuration for single engine flight: first, we note that in my configuration I have located the propellers fairly forward of the center of gravity of the aircraft at a distance $d_N$ approximately equal to, or having a distance $d_N$ greater than, that of the propeller diameter, and with the propeller hub located as close as possible to the airplane's center line and approximately at a distance equal to the radius of the propeller. Additionally, however, as a very important feature, a large "toe out" angle is prescribed for the thrust line, which angle should be measured about a vertical axis at the propeller hub with the propeller hub located approximately as is shown in the drawing; this angle is $A_P$, of approximately 20° in magnitude. This angle about the propeller hub so located produces a large reduction of distance $d_T$ between the aircraft center of gravity 32 and the line of action of thrust $T_A$. The reduced distance is $d_T$ which is seen to be about or less that of the width of the fuselage at the region of the wing and less than the distance approximately equal to the propeller radius. Observe that a toe out angle in a conventional engine nacelle location cannot produce such a small value of $d_T$. In order to get this decreased value, the hub of the propeller should be located as shown.

The propeller so oriented directs a slipstream to the rear which is inclined to the longitudinal axis of the aircraft by an angle $A_{SST}$ ahead of the vertical tail surface 26, which slipstream is redirected to a final direction approximately parallel to flight through $V_A$ by means of a vertical tail 26, which in the process of redirecting the slipstream by an angle $A_{SST}$ as shown, produces a side force $V_{SS}$ which acts in a direction which tends to cancel any adverse yaw effects due to thrust single engine operation even without the application of a rudder deflection. This cancelling effect is helped by having the mode of rotation of my propeller 23 such that outboard tip goes up and the inside tip goes down.

I now write the equation of yawing couples for my configuration during a single engine operation, about a vertical axis through the center of gravity 35 of the aircraft. For this equation, positive terms will be those considered yawing the aircraft towards the side of the operative engine. We now write:

$$-T_A \times d_T + N_P \times d_N + M_P + Y_{SS} \times d_y = N \quad \text{(II)}$$

where $N$ is the net yawing couple of the aircraft in single engine flight conditions.

I now analyze the above equation for equilibrium in single engine flight, where $N$ should be by definition zero. Evidently the only term which produces unfavorable yaw is the term $T_A \times d_T$; if this negative term is equal in magnitude to the sum of the remaining positive terms, then the aircraft will not yaw in single engine flight even without the application of rudder forces. I now evaluate the relative order of magnitude of the remaining terms.

As a first and most important calculation of an excellent and unique feature of the invention, I estimate the stabilizing effect of $N_P$ and $M_P$. For this purpose I want to evaluate contribution of $N_P$; we establish the ratio $$\frac{N_P}{T_A}$$

for STOL flight:
I use NACA TN 3304 showing data of propeller forces alone. (The wing here, unlike a tilt wing, does not affect propeller forces.) FIGURE 12.C of TN 3304 gives values of $$C_{N_P}''$$

as function of propeller angle of attack for $T_C''=0.50$ which is the one closest to STOL operation. The value we seek depends on this coefficient where $C_{N_P}''$ = normal force coefficient of propeller = $\dfrac{N_P'}{q''S}$ (S = wing area)

and $T_C''$ = axial force coefficient of propeller = $\dfrac{T_A}{q''\frac{\pi}{4}D^2}$ (D = prop. diameter)
Evidently then $$\frac{N_P}{T_A} = \frac{C_{N_P}''q''S}{T_C''q''\frac{\pi}{4}D^2} = \frac{C_{N_P}''S}{T_C''\frac{\pi D^2}{4}}$$

From FIG. 2 of the report $$\frac{S}{\frac{\pi D^2}{4}} = \frac{2(18.167)(41)}{\frac{\pi}{4}(24)^2} = \frac{(745)}{(576)} = 3.29$$

From FIGURE 12.C for $\alpha = 20$ we have $C_{N_P}'' = 0.009$ for $T_C'' = 0.50$; for $T_C'' = 0.50$.

$$\frac{N_P}{T_A} = \frac{0.009(3.29)}{0.5} = \frac{0.0296}{0.5} = 0.059$$

To investigate the effect of $M_P$, we read from FIGURE 13, the equivalent lateral inboard displacement of line of action of thrust $T_A$. For $T_C''=0.50$ (correcting for obvious error in figure since at $\alpha=0$, $$\frac{r}{R} = 0$$

but using slope only) we get $$\frac{r}{R} = 0.06 \text{ for } \alpha = 20$$

in terms of propeller diameter $$M_P = T_A\left(\frac{r}{R}\right)\frac{D}{2}$$

$$\frac{r}{R} = \frac{r}{R} \times \frac{2R}{D} = 0.06(1) = 0.06$$

From FIG. 13 in terms of propeller axial force $$M_P = T_A(0.06) = 0.03 T_A$$

I now calculate the total stabilizing contribution of propeller normal force and propeller moments. For this purpose, I prescribe some pertinent dimensions to the structure, as shown in auxiliary FIG. 2a, in terms of propeller diameter D. Let $$d_t = \frac{D}{6} = 0.166D; \text{ and } d_N = 1.3D$$

The yawing equations have the following propeller load contributions $$= -T_A d_t + N_P d_N + M_P \quad \text{(III)}$$
$$= -T_A(0.166D) + (0.059)(1.3D)T_A + 0.3DT_A$$
$$= -0.166DT_A + 0.0767 DT_A + 0.03DT_A$$
$$= (-0.166 + 0.1067) DT_A$$
$$= -0.0593 DT_A$$

The usual net destabilizing moment in single engine flight due to propeller loads is approximately $-0.80T_AD$ for a normal configuration, or about thirteen times more. We conclude, therefore, that by virtue of my peculiar "toe out" configuration with the adequate relative location of propeller hub, thrust line and center of gravity, apart from any rudder and slipstream flow considerations, the configuration exhibits an automatic "aerodynamic feedback" which appears with engine failure to correct the thrust unsymmetry by the automatic action of significant and useful propeller normal forces and moments to trim out the lack of symmetry. The configuration exhibits greatly reduced or negligible yawing moments due to single propeller thrust in single engine STOL flight with the subsequent improvements in controllability, climb and safety.

We now consider separately the slipstream effect on the vertical tail, as only the production of slipstream causes the presence of the destabilizing yawing couple $-T_A d_T$ and the stabilizing couple $+Y_{SS} d_y$.

In the ideal case in which the entire slipstream were deflected only by the vertical tail, elemental momentum considerations would indicate an ideal value of $Y_{SS} = T_A \sin A_p$. Actually, however, part of the slipstream is deflected by the relative airstream outside of the propeller prior to the slipstream arrival to the tail, as shown in the FIGURE 2. If this were the only effect then we could write $Y_{SS} = T_A \sin A_{SS}$ where $A_{SS}$ is angle of attack of slipstream relative to vertical tail. As an order of magnitude $A_{SS}$ may be about one third of $A_p$ for large slipstream dynamic pressures of this order encountered in STOL flight. Additionally, however, there are losses in $Y_{SS}$ due to the inability of the vertical tail to turn the entire slipstream, because of vertical tail area limitations depending on individual design, interferences of fuselage, etc. This is represented by a constant $K_1$ less than 1.

We may write then as an approximation:

$$Y_{SS} = K_1 T_A \sin \frac{1}{3} A_p \qquad (IV)$$

We then estimate $K_1$ at 0.4 and obtain, with $A_p = 20°$
$Y_{SS} = 0.4(0.122) T_A$ where $\sin 7° = 0.122$
$Y_{SS} = 0.0488 T_A$
From the figure, using the propeller diameter as a scale factor, the stabilizing couple is $Y_{SS} d_y = 0.0488 T_A d_y = 0.0488 T_A 1.82_D = 0.089 DT_A$, calculated for neutral rudder.

We conclude from the above statements that on my "toed out" configuration the slipstream effect in single engine flight will produce a reduction of adverse yawing couples of a magnitude approximately equal to one half of the adverse yawing couples due to single engine thrust. It is stated for my toed out configuration because by virtue of this configuration it is that the relative order of magnitude becomes significant. Consider, for instance, a usual toe-out angle of 4 degrees; in the usual installation like the Mohawk airplane, assuming the same slipstream condition and tail moment arm as in FIG. 2 we have from Equation IV:

$$Y_{SS} = 0.4 \sin \left(\frac{4}{3}\right)° T_A = 0.008 T_A$$

which is extremely small. The stabilizing moment would be greatly reduced also at $0.008 \, T_A(1.82D) = 0.015 T_A$. On the other hand, the destablizing moment would be approximately $T_A(0.8D)$, and we see then that the usefulness of the usual four degree toe out is negligible as it only amounts to about 1/55 of the yawing moments of the unsymmetric thrust.

It should be observed that in my calculations I have discovered the great importance of the toe out angle: the corrective force does not vary linearly with the toe out angle as is usually assumed intuitively, but depends on a sine trigonometric function; the prescription of large angles toe out becomes possible by virtue of my ingenious efficient configuration of reduced unsymmetric forces with low drag, high lift, and excellent propulsive efficiency with both engines operating at large toe out angles.

We now evaluate Equation II for the net yawing couple N for single engine flight, using the rigorous wind tunnel data of TN 3304 on propeller loads and the approximate but very valid (specially at zero rudder) values of slipstream additional beneficial effects:

$N = -T_A(0.166D) + T_A(0.0767D)$
$\qquad\qquad + T_A(0.03D) + T_A(0.089D)$
$N = +0.030 \, T_A D$ and the aircraft turns to the side of the unoperative engine.

Before concluding this discussion on yaw equilibrium and propeller loads, let's consider Equation III again, showing only propeller loads. The destabilizing moment is $-T_A d_t$. Now by consideration of FIG. 2, which shows distance $d_t$ to have a finite value and which shows also an intersection of line of action of propeller axial thrust $T_A$ with center plane of fuselage at location 34 having a distance $d_1$ to the rear of the center of gravity 33, it is my discovery that by making distances $d_1$ and $d_t$ approach zero, one obtains a condition in Equation IV which shows positive yaw in single engine operation i.e., the aircraft yaws to side of inoperative engine since the only negative term of Equation III is $$-T_A d_t = -T_A(0) = 0$$

and the other terms are finite and positive. The corresponding geometry is shown in FIG. 2b which is incorporated in a swept back wing to aid in locating the center of gravity to the rear of the wing fuselage intersection. For this case then, assuming same remaining moment arms and same propeller loads, we have, in single engine flight.

$N = 0 + 0.0767 \, DT_A + 0.03 \, DT_A$
$N = +0.1067$ and without taking into account any rudder and fin effect, aircraft turns to the side of operative engine.

Another most important feature of my invention is its superior breaking ability on landing by use of reverse thrust. Evidently in my configurations of FIGS. 2b, 2a, 2 and 1, it is possible to provide single engine reverse thrust with negligible or greatly reduced yawing couples for STOL in flight or on ground stopping action. It follows then that for twin engine breaking flight the STOL stopping capabilities are really extraordinary even if the reverse thrusts are not exactly the same. For single engine reversed thrust braking, the yaw stability is also greatly improved, as can be observed in FIG. 2 where reverse thrust $T_R$ acts through the center of gravity of the aircraft to stop it without yaw due to $T_R$.

Another important feature for reverse thrust is the appearance of an unusual lateral force $N_R$ pointing inwards and tending to yaw the airplane while braking towards the side of the inoperative propeller which is favourable to avoid ground loop.

The breaking features, as well as the positive forward thrust single engine features, of my configuration can produce very large forces above the center of gravity for stopping and accelerating. Thus, a four-wheel gear is of advantage to fully utilize these forces. A main gear and a nose wheel is used for takeoff with forward thrust, and a main gear with a tailwheel is used for full breaking with reversed thrust in landing. This I show in FIG. 3 in which main gear 4 is shown with additional retracted forward gear 18, and separate tail gear spring skid 19, which could also be a wheel if preferred. This four point gear arrangement acts in cooperation with the breaking and take-off features of the STOL aircraft to allow full utilization of thrust for take off and landing.

The single engine braking and accelerating features of my configuration are also peculiarly well adapted to seaplanes, as these aircraft are well known to present special yawing and rolling problems at slow speed water movement due to unsymmetric yaw and roll.

In the previous description of my FIGS. 1 and 2, 2a and 2b I have shown how my configuration will provide not only most efficient propulsion with both toed out engines operative, but how it has greatly reduced or even favorable yaw, for single engine operation which appears automatically even without taking into account rudder forces.

It is pertinent to note that in order to embody the above configuration into a low drag combination, with adequate propulsive efficiency (here in the sense that $$T_E = T_A)$$

it is advantageous also to prescribe the appropriate geometry in the nacelle fuselage intersection which will result in the absence of deteriorated slipstream flows, and which will greatly improve also the stability and lift capability of the center section of the aircraft. In FIG. 2, the geometric difficulties and solutions are shown in a high wing arrangement.

I show in FIG. 2 a fuselage 21, a wing 30 and a nacelle 24. Now note these special features: ahead of the actual intersection of the nacelle and fuselage, and between them, I have placed a wing-shaped fillet 32 which smoothy separates the slipstream and flow that goes on top and below the fuselage inboard of the nacelle preventing the formation of a turbulent region at the joint of nacelle and fuselage. This fillet should have an airfoil shaped entry and a leading edge slat 31 installed in the fillet itself to extend and retract for high lift slow speed flight and high speed flight, respectively. This fillet and slat become very important in the side of the aircraft with an inoperative engine wherein the absence of a slipstream would be otherwise detrimental at high lift. Also, it is seen that nacelle has an outboard edge 24 which is approximately parallel to the aircraft's center line; again, this peculiar nacelle shape is provided to improve the flow on the wing and nacelle junction on the side of the aircraft which has an inoperative engine. The result is an unusual approximately triangular shaped nacelle with the apex at the propeller hub and the base at the wing.

Even for the case of very small or no toe out in the engines, special aerodynamic advantages are obtained in locating the root of the nacelle as shown at the wing-fuselage function, rather than in the usual outboard wing position, as this permits to fair the nacelle with the junction volume and to fair the junction with the nacelle; furthermore the new nacelle location eliminates the usual poor wing flow between the usual nacelle location and fuselage, and permits to locate the propeller hub close to the center plane of the aircraft to minimize yawing couples due to propeller thrust in single engine flight.

Certain important remarks are made on the configuration described in relation to propulsive efficiency in single engine climb and single engine lift: vertical tail 26 by redirecting the slipstream as shown in the figure aids in improving the propulsive efficiency of the "toe out" propeller in the single engine condition not only by decreasing otherwise drag-producing rudder deflections but also by aerodynamically minimizing the overall change of direction of the slipstream flow; the rolling effects due to single engine slipstream are small because the additional wing lift due to the slipstream is located close to the airplane's center of gravity; the decreased roll due to slipstream and the decreased roll due to decreased yaw permits the use of small span outboard ailerons 29 and large-span efficient flaps 28. The wing may have, if desired, an inboard slipstream trim surface and/or aileron 29 to further minimize unfavorable roll due to slipstream in single engine flight conditions only.

In FIGURE 3, I show in front elevation the most peculiar and unique apearance of my new aircraft configuration shown in FIG. 1: there is shown in a central fuselage 1 supporting a low wing 2 and mounting two nacelles 3 and 4 on the aircraft's left side and right side, respectively, in a position which appears as horns symmetrically disposed above an aircraft's central vertical plane. The propeller tip path appears as ellipsis 5 and 6 due to the toe out inclination of the nacelles. Also, between the horn-like nacelles and the fuselage, there appear the front elevation of fillet fairings 12 and 13 between the nacelles 4 and 3 and the fuselage 1 which fillets in this case should have swept leading edges from the nacelles to the fuselage. Additionally, between the forward ends of the nacelles and above the fuselage, there is mounted horizontally a pitch control and high lift auxiliary canard surface 9 which establishes high lift flow between the nacelles, and which provides pitch control by variations of the orientation of canard surface 9 with respect to the slipstream during slow speed flight by tilting it about axis 15. The location of this auxiliary canard surface illustrated also with the aid of FIGURE 1 showing auxiliary surface 9 adjacent to the propeller hubs. With respect to the auxiliary canard located in the slipstream of a propeller, this is not considered to be new. There is, however, a new and unique cooperation and structure in installing my canard surfaces mounted on and between nacelles which nacelles are on the side of the fuselage; my canard surface is located in the propeller slipstreams of a multi-engine configuration which is not a single engine configuration in a manner independent of the fuselage and across it on top of it; my canard surface retains adequate auxiliary surface moment arm with respect to the center of gravity such that useful control couples can be provided, and in which a single surface is useful even in single engine flight. Obviously in a normal configuration of multi-engine aircraft, such an auxiliary surface for pitch control would be impossible and would not have a required moment arm. Observe that in FIGURES 1 and 3 there is shown a forward located single canard surface or elevator 9 capable of producing pitching couples of large magnitude and which is effective for multi-engine arrangements without any special supporting structures for it and which obviously also works for multiengine or single engine flight as an attitude control enhanced by slipstream effects.

I now consider the use of my yawed propellers as shown with toe-out angles to operate near the speed of sound. It is known that propellers become inefficient when the effective blade tip speed $V_T$ becomes near sonic. Now $V_T$ is equal to vector sum of peripheral speed $Wr$ plus airplane speed $V$ when the propeller is not yawed: that is $$V_T = [(Wr)^2 + V^2]^{1/2}$$

Now for the yawed propeller, the tip speed becomes a function of quadrant location and angle of toe-out $A_{T_o}$; with the propeller of FIGURE 2b turning clockwise when viewed from the front as in FIGURE 2c, we have the following approximate relations:

$V_T$ upper quadrant $= [(Wr + V \sin A_{T_o})^2 + (V \cos A_{T_o})^2]^{1/2}$ $V_T$ side quadrants $= [(Wr)^2 + (V \cos A_{T_o})^2]^{1/2}$ $V_T$ lower quadrant $= [(Wr - V \sin A_{T_o})^2 + (V \cos A_{T_o})^2]^{1/}$ By examination of the above expressions, we conclude that a yawed propeller will have its upper quadrant encountering compressibility effects before an unyawed propeller, but the remaining three quadrants will encounter compressibility effects at a higher flight speed than the unyawed propeller. Now the power required to turn the propeller is the deciding factor, and it is thought that by yawing the propeller and operating it with three quadrants sub-sonic and one quadrant supersonic, it is likely that the flight mach number obtainable for given power input is greater than the flight mach number that could be obtained for the same power in an unyawed propeller which has all of its quadrants operating near sonically or transonically.

My configurations are also applicable to ducted propellers, ground effect machines which fly above a surface, turbofans, and the like.

Before concluding these specifications, it is well to review the aircraft yawing problems, state-of-the-art solutions, and my invention. For existing STOL aircraft operating at reduced speeds, or having relatively large propeller thrusts, the single engine flight produces large destabilizing yawing moments which increase with decreasing airspeed; on the other hand the stabilizing yawing couples available decrease with decreasing airspeed. The result is that aircraft have to fly above a minimum control speed which very often is larger than stall speed, as is well known to be the case for turpoprop aircraft using slipstream flows for high lift. These problems are clearly illustrated in FIGURES 8–16 of Chapter 8 of text: "Airplane, Performance, Stability and Control," by Perkins and Hague, 1949. (John Wiley and Sons, Publisher.)

All previous solutions, based on standard aerodynamic knowledge and geometries, has usually prescribed use of small "toe-out" angles for multiengine configurations, together with large twin vertical tails located in the slipstream of the propellers; in some cases the vertical tails have had "toe in" angles. Some examples of this solution are British Patent 293,063 and Italian Patent 305,846. The advent of turbopropellers, however, has to aggravated the yawing problems that it has become necessary to prescribe a different solution for the yawing problem, which presently is that of cross-shafting multipropeller aircraft. This however, is a heavy and expensive solution, as is known to those familiar with the art.

I have invented a new solution to multiengine configuration to solve the single engine yawing problems: my solution is specially adapted to aircraft having two independent turbopropellers which are not cross-shafted and which produce large axial thrusts and propeller lateral loads and couples in a horizontal plane; my configuration is specially useful for STOL turboprop aircrafts having propeller thrust-weight ratios of the order of or greater than 0.35, and capable of developing additional airplane lift due to slipstream flow to produce total airplane lift coefficients greater than approximately 3.5 such as had by STOL aircraft.

I summarize the characteristics and features of my invention: I have discovered, by a new analysis of propulsion mechanisms of yawed propellers, a new configuration which permits the use of large "toe-out" angles of multiengine aircraft with virtually no loss of propulsive or effective thrust due to "toe-out" angle. This permits the designer to prescribe his "toe-out" angle as desired. Furthermore, I have discovered a unique and novel way to use lateral propeller loads and propeller couples in a horizontal plane which cancel each other during multiengine operation, but which introduce significant automatic stabilizing loads in yaw in single engine flight.

In my configuration an otherwise standard monoplane aircraft should have each propeller hub located close to the center vertical plane of the aircraft, preferably at a distance no greater than approximately the length of the propeller radius. The axis of the propeller and its slipstream, is directed rearwardly and inwardly to intersect at the vertical plane; the perpendicular distance between the propeller axis line and the center of gravity should be small and preferably less than the fuselage width at the wing location and less than a distance approximately one half of the propeller radius; the "toe out" angle should be of the order of 15 or 20 degrees, and the slipstreams are arranged to redirect each other rearwardly in peculiar cooperation of multiengine flight such that the propulsive efficiency is very good. However, single engine failure automatically produces the appearance of stabilizing propeller and fin connective yawing couples to greatly reduce or eliminate adverse yaw due to single engine thrust.

Not only that, but for breaking purposes reversed thrust can be applied with both or a single engine without ground looping the aircraft even if the reversed forces of the propellers are not exactly equal.

Furthermore, I have determined a unique arrangement of single tail installation in a multipropeller configuration with advantageous use of my slipstream flow to provide yaw stabilization without rudder deflection thereby retaining rudder for yaw control. In my configurations, I have prescribed adequate low drag and high lift fillets and slats, new and unique "horned" nacelle arrangements for high and low wing aircraft, and a peculiar use of a single canard surface in a multiengine configuration as an auxiliary pitch control surface for high lift flight which works in single engine flight.

While several specific structures embodying my invention have been illustrated and described in detail herein, it is obvious that many modifications in the structures can be made without departing from the scope and spirit of my invention. The actual scope of my invention is indicated by reference to the appended claims.

I claim:
1. A flying vehicle having a central body portion with a forward end, a central plane passing through a longitudinal axis of said body, and a vehicle center of gravity, a pair of propulsive powerplants one mounted on each side of said vehicle adjacent to said forward end one separate from the other, with each of said powerplants having a powerplant longitudinal axis outwardly and forwardly oriented with respect to said central plane at an outward angle, an upstream powerplant end portion located ahead of said center of gravity at a distance approximately at least as great as the perpendicular distance between said powerplant upstream end portion and said central plane and an operative regime in which fluid is impelled rearwardly and inwardly from said powerplant along said longitudinal axis toward said central plane during which regime a lateral force perpendicular to said longitudinal axis, approximately horizontal, and away from said central plane is developed at said front end of each of said powerplants with said force having a line of action passing well ahead of said center of gravity; said powerplants and vehicle having as an inherent characteristic of stability that when in normal simultaneous operation the powerplants have their respective lateral forces substantially cancelling each other, and when one of said powerplants ceases operation the lateral force developed by the remaining operative one of said powerplants immediately produces a turning couple tending to rotate said vehicle about a vertical axis through said center of gravity to the side of said operative powerplant.

2. An aircraft having a central body with a tail end, a middle portion and a forward end, a central vertical plane passing through a central longitudinal axis of said body, and an aircraft center of gravity;

A pair of propulsive powerplants with propellers mounted on said aircraft with one powerplant being separate from the other on each side of said central plane and adjacent to said forward end, with each of said propellers having a propeller shaft outwardly and forwardly oriented at a toe-out angle with respect to said central plane, the hub of said propellers being located ahead of said center of gravity at a distance at least as great as approximately the perpendicular distance between the hub of said propellers and said central plane, with said powerplant and propellers having an operative regime in which a propeller slipstream is impelled rearwardly and inwardly towards said central plane during which regime, in addition to an axial shaft force, a lateral force perpendicular to said shaft and approximately horizontal is developed by each of said propellers in a direction away from said central plane, said lateral force having a line of action passing well ahead of said center of gravity;

Said aircraft having an as inherent yaw characteristic that, when in normal simultaneous propeller operation said lateral forces substantially cancel each other, and in that when one of said powerplant ceases operation, the lateral force of the remaining operative one of said propellers immediately produces a couple which cooperates in stabilizing said aircraft in yaw and tends to yaw said aircraft about a vertical axis through said center of gravity in a direction contrary to the yawing couple produced by the axial force of said propeller.

3. The aircraft of claim 2 further characterized in that said central body is a fuselage having an upper surface, in that said powerplants are mounted in nacelles on said fuselage adjacent to said upper surface in a horned nacelle disposition with said nacelles projecting outwardly from said fuselage in a forward and lateral direction, and in that an approximately triangular fillet is placed between each of said nacelles and said fuselage with the apex of said triangular fillet located adjacent to the joint of one of said nacelles and fuselage and with the base edge portion of said triangular fillet which extends between each of said nacelles and said fuselage having approximately the shape of the leading edge of an airfoil.

4. The aircraft of claim 2 further characterized in that said central body is a fuselage having a top surface and a lower portion, in that a pair of principal wings are mounted adjacent to said lower portion of said fuselage with principal landing gear means mounted on said wings, and in that said powerplants with propellers are mounted on said fuselage on fixed nacelles adjacent to said upper surface and remote from said wings in a horned disposition with said nacelles projecting outwardly from said fuselage at a forward and lateral direction and with the discs of said propellers being located one on each side of said central plane.

5. The aircraft of claim 2 further characterized in that said central body is a fuselage having an upper portion, in that a pair of wings are mounted on said fuselage adjacent to said upper portion, and in that said powerplants are mounted on said aircraft on nacelles located substantially immediately adjacent to the joint of said wings and fuselage with said nacelles projecting forwardly from said joints and having a nacelle planform shape approximately of triangular form having an apex located adjacent to the hub of said propellers, a base adjacent to said wings, an outboard side approximately parallel to said central plane and an inboard side at an angle to said central plane approximately equal to said toe-out angle.

6. An aircraft having a central fuselage with a nose portion and a central vertical plane, a pair of propulsive powerplants mounted on said aircraft one separate from the other on each side of said vertical plane with each of said powerplants having a fixed powerplant nacelle with a root portion supported by said aircraft and a forward end with a propeller having a propeller hub located at a fore-and-aft location adjacent to the fore-and-aft location of said nose portion and at an elevation well above that of the upper surface of said nose portion; an auxiliary canard-airfoil supported by said nacelles adjacent to said propeller hub and remote from said nacelle root portion with said auxiliary canard-airfoil being located well above, across and separate from said nose portion and being mounted for movement with respect to said nacelle about a canard-airfoil spanwise axis substantially perpendicular to said central plane to change the effective angle of attack of said canard-airfoil in relation to the slipstream of said propellers to vary the pitch attitude of said aircraft.

7. An aircraft having a central body with a front end portion, a central longitudinal axis, a vertical plane passing through said longitudinal axis and an aircraft center of gravity; a pair of powerplants with propellers mounted on said aircraft one on each side of said central plane and adjacent to said front end portion with each of said propellers having a propeller axis of rotation which is outwardly inclined at a toe-out angle with respect to said central plane, and a propeller hub located upstream of said center of gravity at a distance at least as great as the perpendicular distance between said hubs and said central plane; with each of said propellers capable of producing a reversed axial thrust for decreasing the speed of said aircraft which reverse thrust directs a slipstream of air away from said central plane, and a propeller horizontal lateral force perpendicular to said propeller axis and towards said central plane and having a line of action passing well ahead of said center of gravity; said aircraft having as an inherent yaw characteristic that, when in normal simultaneous powerplant operation with reversed thrust generated by said propellers said lateral forces substantially cancel each other, and in that when one of said powerplant ceases operation, the lateral force of the remaining operative propeller immediately produces a couple which cooperates in stabilizing said aircraft in yaw and tends to yaw said aircraft about a vertical axis through the center of gravity in a direction contrary to the sense of the yawing couple produced by the reversed thrust of said operative propeller.

8. The aircraft of claim 2 further characterized in that said central body has a pair of wings mounted thereon to the rear of said propellers with each of said wings having a first portion of their upper and lower surfaces adjacent to said central body immersed in said slipstreams to produce substantially symmetric additional wing lift in slow speed flight by deflecting said slipstreams downward, and in that when said one powerplant ceases operation, the wing located to the rear of the operative propeller has a second portion of its upper and lower surface immersed in the slipstream of the operative propeller, said second portion having its outboard edges located inboard from the outboard edges of said first portion towards said central plane, whereby the asymmetric rolling moments due to additional slipstream lift is greatly decreased.

9. The aircraft of claim 2 further characterized in that each of said propellers when operative develops a turning couple in a horizontal plane tending to yaw said aircraft; and in that when in normal simultaneous propeller operation said couples inherently cancel each other substantially completely, but when in single powerplant operation the turning couple developed by the operative propeller cooperates to stabilize said aircraft in yaw by tending to yaw said aircraft about a vertical axis through said center of gravity in a direction contrary to the yawing couple produced by said axial force of said propeller.

10. The structure of claim 9 further characterized in that the horizontal projection of the perpendicular distance between the axial projection of said propeller shafts and said center of gravity is no greater than a distance substantially equal to one-half the radius of said propeller, and in that the perpendicular distance from the hub of said propellers to said central plane is approximately equal to the radius of said propeller.

11. The structure of claim 9 further characterized in that the horizontal projection of the distance between said center of gravity and said propellers is at least as great as one and three-tenths the diameter of said propellers, in that the horizontal projection of the perpendicular distance between the axial projection of said shafts and said center of gravity is no greater than approximately one-sixth of said propeller diameter, and that in each of said toe-out angles is at least as great as approximately fifteen degrees.

12. The structure of claim 2 further characterized in that upon failure of operation of one propeller, the slipstream of the operative propeller crosses said central plane at a location adjacent to said middle portion of said central body upstream from said tail end from the side of the operative powerplant to the side of the inoperative powerplant.

13. The structure of claim 12 further characterized in that said aircraft has a central vertical fin mounted on said tail end, with said fin having fixed right and left side surface portions parallel to said central plane and immersed in said slip-stream which produce a lateral fin load by redirecting said slip-stream toward the side of said operative propeller to further cooperate, without deflection of said fixed surface portions, to stabilize said aircraft in yaw.

14. The structure of claim 12 further characterized in that when both of said propellers are in normal operation, said slipstreams leave said propellers one separate from the other, with said slipstreams coming into contact at an angle with each other adjacent to said middle portion and said central plane and cooperating to redirect each other ahead of said tail end to flow downstream in a direction parallel to said central plane.

15. An aircraft having a central fuselage with a central vertical plane, a nose portion, and side surfaces;

A pair of wings mounted on said aircraft extending laterally from said fuselage outboard from said side surfaces with said wings having leading edges;

A pair of separate propulsive powerplants mounted on said aircraft one on each side of said central plane with each of said powerplants having a fixed nacelle with a nacelle root portion located substantially at and faired smoothly into the joint of one of said wings and said fuselage and contiguous to one of said side surfaces with said nacelle projecting forwardly from said joint in an outwardly position in which the outboard side surface of said nacelle extends in a streamwise direction to fair into the leading edges of said wings at a wing location outboard from said side surfaces of said fuselage; with substantially the entire surfaces of said leading edges of said wings which are exposed to the airstream being located outboard from said nacelle side surfaces and with each of said powerplants having a propeller with a propeller hub located at a perpendicular distance from said central plane approximately equal to the radius of said propeller and greater than the perpendicular distance from said nacelle root portion at said joint to said central plane.

16. The structure of claim 15 further characterized in that said wings are mounted adjacent to the top surface of said fuselage, in that said nose portion of said fuselage extends upstream from said joints at an elevation lower than the elevation of said nacelles, and in that an auxiliary canard airfoil extends between said nacelles adjacent to said propellers with said canard airfoil being adapted to be moved about a spanwise axis to vary the effective angle of attack of said canard airfoil with respect to said slipstream to contribute to determine the pitch attitude of said aircraft in slow speed flight.

17. An aircraft having a central body with a tail end, a middle portion and a forward end, a central vertical plane passing through a central longitudinal axis of said body, and a direction of flight; a pair of propulsive powerplants with propellers mounted on said aircraft with one powerplant being separate from the other one on each side of said central plane and adjacent to said forward end, with each of said propellers having a propeller shaft outwardly and forwardly oriented at a toe-out angle with respect to said central plane, each of said powerplants and propellers having an operative regime in which a propeller slipstream is impelled rearwardly and inwardly towards said central plane during which regime an axial shaft force, and a lateral force perpendicular to said axial shaft force, are developed; said propulsive powerplants on said aircraft being further characterized in that when one of said propellers is operative and the other inoperative, the slipstream of the operative propeller is inclined at an angle to said central plane with said lateral force tending to stabilize said aircraft in yaw, and with the propulsive force in the direction of flight of said aircraft being equal to said axial shaft force times the cosine of the angle between said propeller shaft and said direction of flight, and in that when in simultaneous operation of both of said propellers said slipstreams cooperate to redirect each other to a direction substantially parallel to said central plane adjacent said middle portion, with the propulsive force on said aircraft in the direction of flight of said aircraft being greater than two times said propulsive force of said one operative propeller when said other propeller is inoperative, and approximately equal to twice the axial force had by one of said propellers when in normal simultaneous operation.

18. An aircraft having a central body with a nose portion and a central vertical plane, a pair of wings extending laterally from said central body and having wing root portions, a pair of powerplants adjacent said central body mounted on said aircraft one separate from the other on nacelles extending forwardly and outwardly from an aircraft location adjacent said wing root portions, each of said powerplants having a propeller adjacent said nose portion which when operative directs a slipstream rearwardly and inwardly towards one of said wings and fuselage to develop, in addition to an axial thrust, a lateral propeller force perpendicular to said axial thrust, with a substantial portion of the slipstream of each propeller flowing on top of one of the said wings to substantially augment wing lift; said aircraft and powerplants being further characterized in that when in normal simultaneous operation said slipstreams redirect each other to flow approximately parallel to said central plane substantially one slipstream on each side of said central vertical plane with each of said slipstreams flowing into contact with a first wing area portion having a first area centroid and with each of said slipstreams developing additional wing lift on said wings; and in that, when one of said propellers is operative and the other one becomes inoperative, the slipstream of the operative propeller immediately crosses said vertical plane to the side of said inoperative propeller, with the slipstream of said operative propeller flowing into contact with a second wing area surface portion having a second area centroid; said second area centroid being located inboard of said first area centroid, and said lateral force of said operative propeller immediately tending to yaw the aircraft into the side of said operative propeller.

References Cited by the Examiner

UNITED STATES PATENTS 1,981,237 11/34 Loughead _____ 244—55
2,448,392 8/48 Quady et al. _____ 244—7

MILTON BUCHLER, *Primary Examiner.*